US006575518B1

(12) United States Patent
Henning

(10) Patent No.: US 6,575,518 B1
(45) Date of Patent: Jun. 10, 2003

(54) FLEXIBLE COVER SYSTEM FOR AN OPEN-TOPPED CONTAINER

(75) Inventor: Steven A. Henning, Speedway, IN (US)

(73) Assignee: Aero Industries, Inc., Indianapolis, TN (US)

( * ) Notice: Subject to any disclaimer, the term of this patent is extended or adjusted under 35 U.S.C. 154(b) by 0 days.

(21) Appl. No.: 10/026,243

(22) Filed: Dec. 21, 2001

(51) Int. Cl.[7] .................................................. B60J 11/00
(52) U.S. Cl. ................ 296/98; 296/100.01; 296/100.15
(58) Field of Search .......................... 296/98, 100.01, 296/101, 100.15, 136

(56) References Cited

U.S. PATENT DOCUMENTS

| 3,763,908 A | * | 10/1973 | Norman ...................... 150/166 |
| 3,862,876 A | * | 1/1975 | Graves ....................... 150/901 |
| 4,341,416 A | | 7/1982 | Richard |
| 4,516,802 A | | 5/1985 | Compton |
| 4,740,029 A | | 4/1988 | Tuerk |
| 5,031,955 A | | 7/1991 | Searfoss |
| 5,275,460 A | * | 1/1994 | Kraus .......................... 296/136 |
| 5,547,445 A | * | 8/1996 | Chang ......................... 482/105 |
| D389,451 S | * | 1/1998 | Wilson ....................... D12/401 |
| 5,758,921 A | * | 6/1998 | Hall ............................. 296/98 |
| 5,957,523 A | | 9/1999 | Haddad, Jr. |
| 6,250,709 B1 | * | 6/2001 | Haddad, Jr. .................. 296/98 |

* cited by examiner

Primary Examiner—D. Glenn Dayoan
Assistant Examiner—Lori L Coletta
(74) Attorney, Agent, or Firm—Maginot, Moore & Bowman

(57) ABSTRACT

A cover system for an open-topped container, such as a dump truck body, includes a flexible tarpaulin sized to extend across the length of the container. A weighted element is carried by the tarp adjacent to but offset from the front end of the tarp. The weighted element is "gravity-biased" so that it pulls the tarp down and holds it down against the load within the container when the tarp is in its deployed position. In a preferred embodiment, the weighted element includes one or more metal bars that are contained within pockets spanning the width of the tarp.

29 Claims, 4 Drawing Sheets

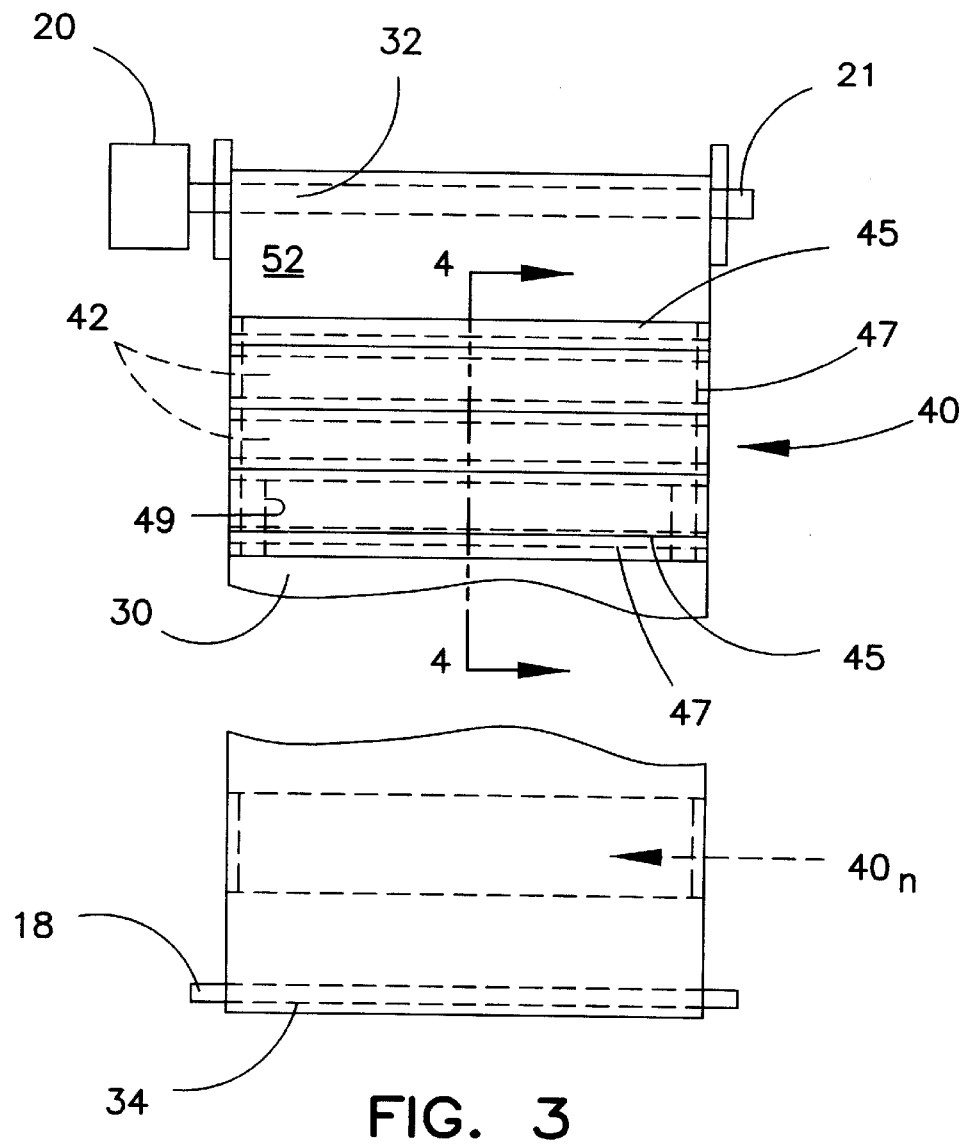
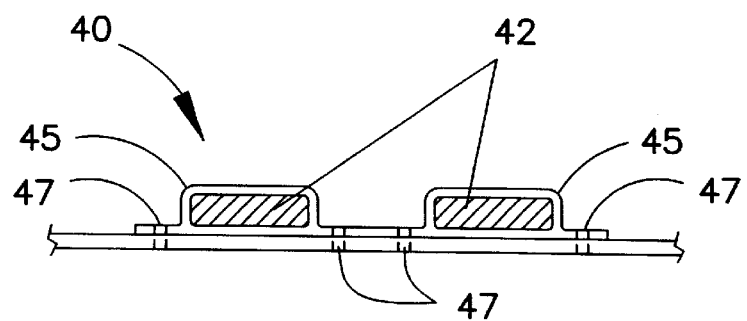
FIG. 4

FLEXIBLE COVER SYSTEM FOR AN OPEN-TOPPED CONTAINER

BACKGROUND OF THE INVENTION

The present invention relates to flexible covers or tarping systems for open-topped containers. The invention is particular related to tarping systems for use with hauling vehicles, such as dump trucks, where the flexible cover or tarpaulin is extended across the open top of the truck body.

Many hauling vehicles, such as dump trucks, include open-topped containers useful for hauling or storing various materials. For example, in a typical dump truck application, the dump body is used to haul a variety of particular material, such as gravel, aggregate or similar products. In addition, some hauling vehicles carry organic materials, such as grain or produce.

Depending upon the nature of the materials stored in the open-topped container, it is often desirable to provide a cover for the container. Of course, rigid covers are well known that may be hinged from end of the container body. These rigid covers have gradually given way in the trucking industry to flexible tarping systems because the flexible tarpaulin can be easily stowed when a cover is not necessary, such as when the dump truck is being loaded. Moreover, the flexible tarp is much easier to deploy than a rigid cover, and is easier to replace when it becomes worn or damaged. Furthermore, in some instances the flexible tarp provides a tighter environmental seal for the contents of the container than is provided by a rigid cover.

A variety of tarping systems have been developed that are geared to particular hauling vehicle applications. Once such tarping system for use with dump trucks is the Easy Pull® tarping system of Aero Industries, Inc. The Easy Pull® system includes a flexible tarp that is wound around a spool at one end of a dump bed. A rope attached to the free end of the tarp can be used to unwind the tarp from the roller to extend along the length of the dump bed.

Another cover system particularly suited for open-topped containers on hauling vehicles is the Easy Cover® tarping system, also of Aero Industries, Inc. The Easy Cover® tarping system includes a U-shaped bail member that is pivotally mounted at its end to the base of the container body. The horizontal section of the U-shaped bail is attached to the tarp, while the free ends of the vertical elements are pivotably mounted to the truck body. In one application, the Easy Cover® tarping system allows the tarp to be manually pulled in a sweeping arc over the container load.

In another application of the Easy Cover® system, an actuation mechanism is provided that automatically pivots the U-shaped bail member to deploy the tarp over the load within the open-topped container. When the actuation mechanism is released, it automatically pivots the bar, thereby unfurling the tarp from the tarp roller at the front of the vehicle. A hand crank or powered motor can be provided to rotate the tarp roller to retract or wind the tarp when it is desired to open the container top.

A vehicle 10 is depicted in FIG. 1 having an open-top dump body 12. As illustrated, the vehicle can be a dump truck, with the open-topped container comprising a dump body. A flexible cover system 14 mounted on the body 12 includes a tarpaulin cover 15 that is shown in its deployed position spanning the length of the container and covering the load within. The tarp cover 15 can be wound onto a retraction mechanism 19, which can be in the form of a roller assembly, such as employed in the Easy Cover® tarping system.

Referring still to FIG. 1, an extension mechanism 17 is utilized to pull the tarp 15 across the container body 12. In the illustrated embodiment, the extension mechanism 17 includes the U-shaped bail member described above. However, for the purposes of the present invention, the extension mechanism 17 can be a variety of types of mechanisms, whether motorized or manual, and whether relying upon pivoting bail arms or longitudinally driven members. However, for the purposes of illustration of the principles of the present invention, a rotatable spring-biased extension bail member is illustrated.

With this illustrated embodiment, the extension mechanism 17 is spring biased so that its natural tendency is to pull the tarp out of the retraction mechanism 19. Again, for purposes of illustration, the retraction mechanism 19 can include a drive motor 20 that rotates a spool 21 or roller to which one end of the flexible tarp 15 is fastened.

With reference to FIG. 2, one difficulty of prior flexible tarpaulin cover systems is illustrated. The container body 12 in this figure includes a top rail 22. A cab shield 26 extends above and forward of the top rail 22 to support the retraction mechanism 19. In one application, the body 12 includes sideboards 24 that extend the length of the container body. The flexible tarp 15 is shown extending over at heaped load L. As shown in FIGS. 1 and 2, the flexible tarp 15 is held in an extended position 28 or 28'. In the case of the extension mechanism 17 shown in FIG. 1, the mechanism itself holds the tarp at its extended position 28. In the configuration illustrated in FIG. 2, the flexible tarp is held in the extended position 28' by a tie-down arrangement. At any rate, when the tarp 15 is fully extended over the length of the container 12 and covering the load L, a gap can exist between the tarp 15 and the interior of the container body, as depicted in FIG. 2.

A similar problem exists where the sideboards 24 are not used. In this instance, a heaped load L' extends slightly above the top rail 22. The flexible tarp 15' then covers the heaped load L' in its extended position 28'. Again, as can be seen in FIG. 2, the tarp 15' has a gap between it and the top rail 22.

In order to eliminate this gap, extra tarp 15 can be payed out from the retraction mechanism 19. With this approach, the tarp will fall over the load L, L'. However, when the container body 12 is on a moving vehicle, such as a dump truck, the wind and vibration generated at traveling speeds causes the tarp 15, 15' to flap and expose the load beneath.

Various solutions have been devised to help hold the excess tarp material down over the load L, L' when the tarp is in its extended position 28, 28'. For example, in U.S. Pat. No. 4,341,416, a linkage and side flap arrangement is employed. With this approach, the tarp includes side flaps that are held against the outside of the truck body by a specific external linkage arrangement.

Another approach is illustrated in U.S. Pat. No. 5,031,955. This approach is limited to use with tarp extension mechanisms utilizing an external bail arm. In this approach, a tension bail arm is pivotally mounted to the extension bail arm. The tension bail arm extends across the outside of the truck body to hold the front portion of the flexible cover down.

Yet another approach is described in pending U.S. application Ser. No. 09/330,143, filed Jun. 11, 1999, by Aero Industries, Inc. and entitled "Tarp Cover Hold-Down System". The system disclosed in this application, which disclosure is incorporated herein by reference, includes a U-shaped bar that resides within the interior of the container body. The bar is spring biased by torsion springs so that it pivots downward to provide a downward force against the front portion of the flexible cover. With this mechanism, the torsion spring applies a constant downward pressure directly on the tarp within the interior of the container body, so that its effectiveness is not limited by the sideboards or rails of the container.

While the system of the '143 Application represents a significant advance in devices for holding a tarp down, it too has its drawbacks. For instance, the disclosed mechanism requires the mounting of an additional component to the container body or to the retraction mechanism. In addition, the hold-down bar of the mechanism must be retracted against the retraction mechanism or roller. Since the bar is spring-biased, it is constantly exerting a downward force against the tarp as it is being deployed to its extended position or retracted to its stowed position. This downward force, coupled with the continuous contact by the bar, can cause additional wear to the flexible tarp.

Consequently, there remains a need for an improved mechanism for holding a flexible tarp down in its extended position. The system must be capable of keeping the cover tightly down over the load L, even against road vibration and wind force generated when traveling at highway speeds. In addition, the improved system would be easily installed, and potentially capable of retrofit to existing flexible tarping systems.

SUMMARY OF THE INVENTION

In order to address these unresolved needs, the present invention provides a cover system for an open-topped container comprising a flexible cover having a first end and an opposite second end, a retraction mechanism connected to the flexible cover at the first end for retracting the cover to a retracted position relative to the container, and an extension mechanism connected to the flexible cover at the second end for extending the cover from the retracted position to an extended position spanning at least a portion of the open top of the container. In a central feature of the invention, a weighted element is carried by the flexible cover between the first and second ends. The weighted element has a weight sufficient to pull the flexible cover down by the force of gravity when the cover is in the extended position.

In certain embodiments, the retraction mechanism can include a spool and means for winding the flexible cover onto the spool. In these embodiments, the weighted element is sized and configured to be wound onto the spool with the flexible cover. Preferably, the weighted element includes at least one weighted bar extending across a portion of the width of the cover. The weighted bar has a width and a thickness sized to permit the weighted bar to be wound onto the spool with the flexible cover.

In the most preferred embodiments of the invention, the flexible cover includes a pocket extending across a portion of the width that is sized to carry the weighted element. Where the weighted element is a bar, the pocket can be appropriately configured. The pocket can be closed around its perimeter to generally permanently house the bar therein. Alternatively, the pocket can be provided with an open end and a flap covering that end. The flap can be displaced to allow insertion or removal of a weighted bar from the pocket.

In some embodiments, the weighted element includes a plurality of weighted bars within a corresponding plurality of pockets. The plurality of pockets and bars can be concentrated at the one location adjacent to the first or front end of the tarp. Alternatively, the pockets and bars can be distributed at locations along the length of the tarp.

Where a single weighted element is implemented, it can be offset from the first end of the tarp by a predetermined dimension so that the weighted element pulls the flexible cover below a top edge of the container when the cover is in the extended position. This predetermined dimension can be adjusted as needed depending upon the configuration of the container. For instance, a dump body having the retraction mechanism mounted on a cab protector requires a certain lag length of tarp to reach the top rail of the dump body. This lag length can be shorter if the dump body includes sideboards.

The weight of the weighted element is calibrated to hold the front end of the tarp down when subject to vibration and wind during over-the-road travel. In a specific embodiment, the weighted element can have a weight of at least ten pounds (about 4.5 kg.). In one aspect of certain embodiments, a retention mechanism can be provided on the container body to help hold the weighted element in place once gravity pulls it and the tarp down. This retention mechanism can be a magnet mounted on the container that magnetically attracts the weighted element.

In an alternative embodiment, the weighted element, and particularly the weighted bars, are attached to the tarp or flexible cover, without the need for the pockets. With this embodiment, the tarp can be provided with grommets for receiving a fastener, such as a nut and bolt arrangement. The weighted element can be provided with holes to receive the bolt, or can have one of the nut or bolt components integrated into the element itself.

Another aspect of the invention contemplates a cover for a cover system for an open-topped container, in which the system includes a retraction mechanism mounted to the container and a extension mechanism. The cover comprises a flexible tarpaulin sized to substantially close the open top of the container when extended, and a weighted element carried by the tarpaulin and having a weight sufficient to pull the flexible tarpaulin down by the force of gravity when the tarpaulin when extended. The tarpaulin can be provided with a number of pockets for carrying the weighted element, which is preferably in the form of individual weighted bars.

In yet another embodiment of the invention, a flexible tarpaulin is provided that is sized to substantially close the open top of a container when extended. The tarpaulin has a first end configured for engagement to a retraction mechanism and an opposite second end configured for engagement to an extension mechanism of a cover system for the container. In one feature of this embodiment, the tarp includes a pocket extending across a portion of the width of the tarpaulin adjacent but offset from the first end thereof. The pocket is sized to receive a weighted bar therein. The tarp can be provided with a plurality of pockets at the first end thereof, or can include a plurality of pockets at a plurality of spaced locations along the length of the tarpaulin.

One object of the present invention is to provides a system for holding a tarp down over a load within a container, even when the tarp or flexible cover is subject to road vibration and wind. One benefit is that this "gravity-bias" feature of the present invention is provided without the need for additional hardware mechanisms mounted on the container or integrated into the tarping system itself. In prior systems, this additional equipment can take a beating during normal use, which damages the equipment and eventually requires pre-mature replacement.

A further benefit of the invention is realized in features that allow the invention to be retrofitted to existing tarping systems. These and other benefits and objects of the invention will be appreciated upon consideration of the following written description and accompanying figures.

BRIEF DESCRIPTION OF THE DRAWINGS

FIG. 3 is a top elevational view of a flexible cover system in accordance with one embodiment of the present invention.

FIG. 4 is a side cross-sectional view of the flexible cover system illustrated in FIG. 3, taken along line 4—4 as viewed in the direction of the arrows.

DETAILED DESCRIPTION OF THE PREFERRED EMBODIMENTS

Figure 1:
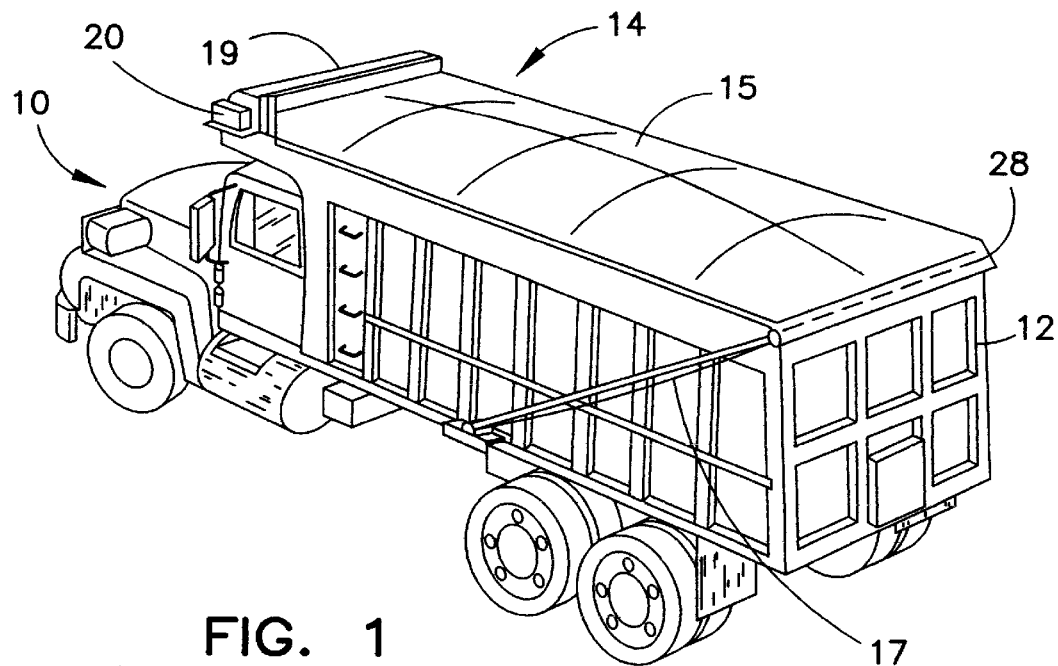
FIG. 1 is a perspective view of a dump truck showing a flexible tarping system spanning the open-topped container of the truck.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Referring now to FIG. 3, a flexible cover system in accordance with a preferred embodiment to the present invention is illustrated. In particular, the system includes a flexible tarp 30 that is sized to cover the open top of a container, such as the dump truck body 12 illustrated in FIGS. 1 and 2. The improved flexible tarp 30 includes a first end 32 that is configured for engagement with a retraction mechanism, such as mechanism 19 described above. In the illustrated embodiment, the first end 32 of the tarp 30 is connected to a spool 21 that is driven by a drive mechanism 20. The connection of the tarp 30 to the retraction mechanism 19 can be in accordance with well-known approaches. Moreover, any type of retraction mechanism is contemplated that can retract the extended tarp to a stowed position.

The tarp 30 also includes an opposite second end 34 that is configured to engage an extension mechanism 17. In one specific embodiment, the second end 34 is configured to be connected to a bar 18 that forms part of the extension mechanism 17. Again, the extension mechanism can be of a variety of manual, spring-biased or powered types.

As thus far described, the tarp 30 can be configured as any conventional tarp of known tarping or cover systems. In one feature of the present invention, the tarp 30 is provided with a weighted element 40, disposed at a front portion of the tarp adjacent to the first end 32. The weighted element 40 is supported by or fastened to the flexible tarp 30 so that it is held in position relative to the tarp as the tarp is extended or retracted. Preferably, the weighted element 40 is configured so that the element can be rolled up with the tarp 30 when the tarp is fully retracted by the retraction mechanism 19.

In the most preferred embodiment, the weighted element 40 includes a number of weighted bars 42. Each of the bars is sized to extend across most of the width the tarp 30. As shown in FIG. 4, in order to facilitate rolling the weighted bars 42 up with the rest of the tarp in its retracted position, the dimension of the bars 42 along the length of the tarp is kept to a minimum, while still maintaining sufficient weight in each of the bars. In addition, the thickness of each of the bars 42 is kept as low as possible, again with consideration to the amount that each of the bars weighs.

The total weight of the weighted element 40, and consequentially the weight of each of the weighted bars 42, can be determined by the amount of "pull down" force necessary to hold the front portion of the flexible tarp 30 down within the container body. Factors contributing to this determination includes the anticipated wind force as the container body is traveling at road speeds, the expected road vibration that the tarp will encounter, and the retraction or tensioning force that the tarp may experience when it is in its fully extended position 28, 28'. It should be understood that the addition of the weighted element 40 provides a form of gravity-bias for the front end of the tarp. Thus, when the tarp is fully unrolled across the container, the weighted element will pull the front portion of the tarp down across the load L, L'.

In some instances, the effects of vibration and wind force are less than the retraction or tensioning force that must be overcome by the weighted elements. It is of course understood that the force of gravity draws the weighted elements down against whatever retraction or bias force is being exerted by the retraction mechanism 19. In one of the typical installations described above, the retraction mechanism includes a torsion spring that is constantly pulling back on the flexible tarp. Thus, the combined weight of the weighted element 40 must be sufficient to counter that retraction force when the cover is in its fully extended position 28, 28'. With certain types of retraction mechanism, it may be necessary to extend the tarp past the end of the open top of the container to draw out a sufficient additional length of tarp so that when the end 34 of the tarp is moved back to its extended position 28, 28' gravity can pull the weighted element down against the load.

In a preferred installation, the retraction mechanism 19 does not exert any biasing or tension force on the tarp. Instead, the extension mechanism 17 is spring-biased to pull the tarp rearward to its extended position 28, 28'. With this type of extension mechanism 17, the retraction mechanism 19 can be essentially "free wheeling" as the tarp is extended, meaning that it does not exert any retraction force against the flexible tarp. Once the tarp has been fully extended, the weight of the weight element 40 can pull more tarp material from the retraction mechanism 19, or spool 21, until the weighted element 40 rests upon the load L, L'. With this approach, the retraction mechanism 19 can permit this "free wheeling" unwinding of the tarp. Alternatively, where the retraction mechanism 19 includes a drive mechanism 20, the drive mechanism can be reversed to release an additional amount of the flexible tarp 30 from the retraction mechanism 19, again until the weighted element 40 contacts the load.

In a specific embodiment, the weighted element 40 includes weighted bars 42 totaling about ten pounds (4.5 kg.) In weight. Thus, the weighted element 40 can include two weighted bars 42 having a width of about 1.0 inches (25 mm) and a thickness of about 5/16th inches (8 mm). If less thickness is desired, ³⁄₁₆th inch (5 mm) bars of greater width can be utilized to produce the desired total weight for the weighted element 40. Of course, the overall dimensions of the weighted bars 42 depend upon the particular material being used. An inexpensive steel is preferred because of its ready availability and easy machinability.

In accordance with the present invention, the weighted element 40, such as the weighed bars 42, must be connected to the flexible tarp 30 so that they are not dislodged during extension and retraction of the tarp. In one specific embodiment, the tarp 30 is provided with a number of pockets 45 that extend along the width of the cover. In one specific embodiment, as depicted in FIGS. 3 and 4, the pockets 45 can be formed by the same material as the tarp 30. The pockets can be sewn to the tarp along an array of seams 47. For certain tarps, the seams can be welded, such as for vinyl tarps and pockets. In an alternative embodiment, the seams 47 can be replaced by other suitable means for fastening, such as spaced brads or rivets, adhesive, or pre-formed pockets within the tarp material itself.

In one specific embodiment, the weighted bars 42 are completely enclosed or sewn into the pockets 45. As an alternative, the pockets 45 can be provided with a flap 49 (see FIG. 3). The flap can cover an open end of the pockets and actually overlap a portion of the pocket material. In this way, the weighted bars 42 can be inserted and removed by simply displacing the flap 49 and repositioning the flap over the end of the bar to enclose the weighted bar. Again, the flap 49 can be formed of the same material as the pockets 45 and the flexible tarp 30.

In accordance with the preferred embodiment, the weighted bars 42 are most preferably housed within the pockets 45 to protect the bars as much as possible from the elements. However, the present invention contemplates other means for connecting or attaching the weighted element 40 to the flexible tarp 30. For instance, the bars can be attached with an appropriate adhesive to the flexible tarp material. In addition, individual fasteners may be used to fasten each bar to the tarp. For instance, the tarp could be provided with a linear array of grommets through which a particular fastener can extend. The fastener can include a bolt that extends through tarp grommet and through a hole in the bar to engage a nut on the inside of the tarp. Optionally, one portion of the fastener can be integrated into each weighted bar itself. Regardless of the means for attaching or supporting the weighted element 40 on the tarp, it is important that the element not be dislodged from the tarp in use.

Figure 2:
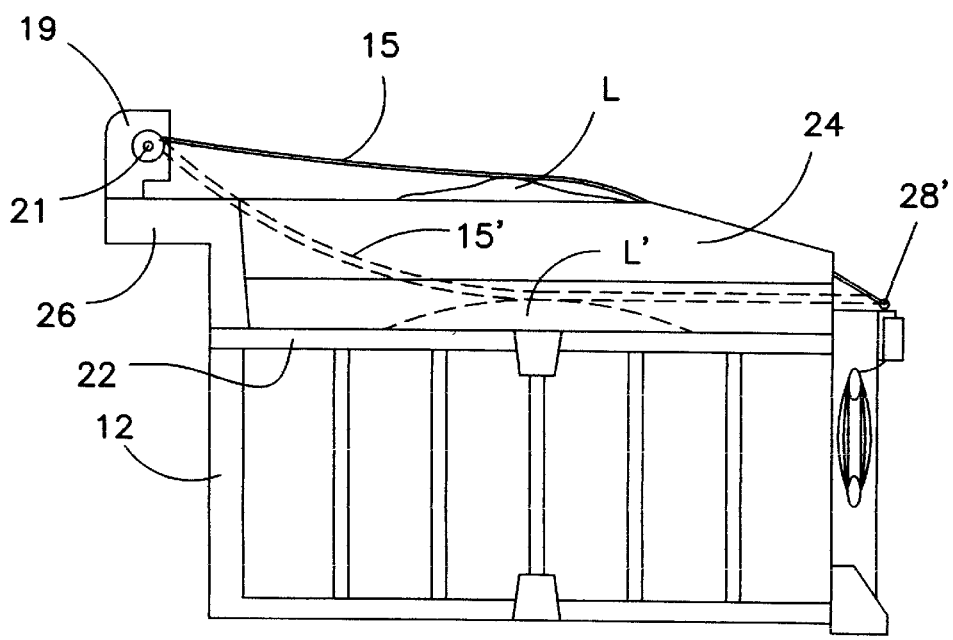
FIG. 2 is a side elevational view of a typical dump truck container body with a flexible tarping system extended over a load within the container body, with and without sideboards.

The weighted element 40 is positioned on the improved tarp 30 a predetermined distance from the first end 32 of the tarp. More specifically, as depicted in FIG. 5c, the weighted element 40 is displaced at the end of a lag portion 52 from the first end 32, or particularly from the retraction mechanism 19. The length of this lag portion 52 depends upon the preferred position of the weighted element 40 when the tarp is in its extended position 28. In the illustration of FIG. 5c, the weighted element 40 is situated near the top rail 22 of the container body. With a configuration as shown in FIG. 2 in which sideboards 24 are utilized, the weighted element 40 would likely be positioned adjacent the top of the sideboards. In this instance, the lag portion 52 would be shorter than the lag portion for the configuration shown in FIG. 5c. With either configuration, the lag portion 52 should be sufficiently long to allow the weighted portion of the tarp to settle on the load L, L'.

Figure 5A:
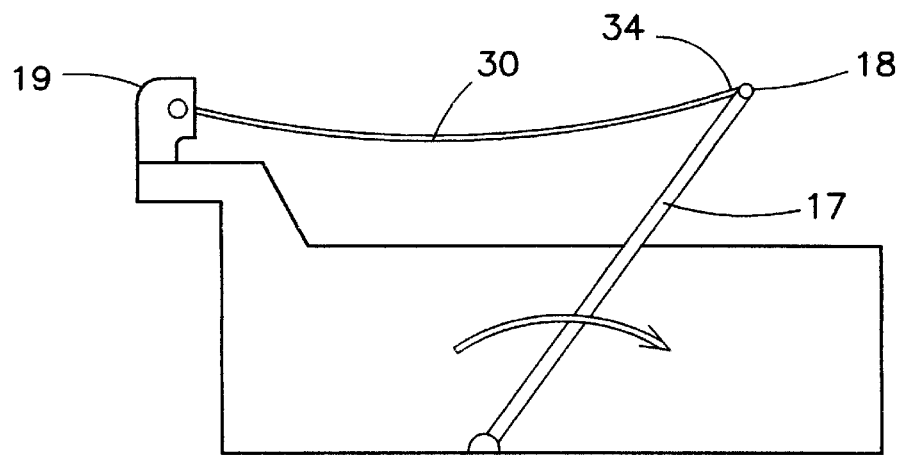
FIGS. 5a–5c are schematic representations of a dump truck body with a flexible cover system according to the present invention shown in different stages of its deployment.
Figure 5B:
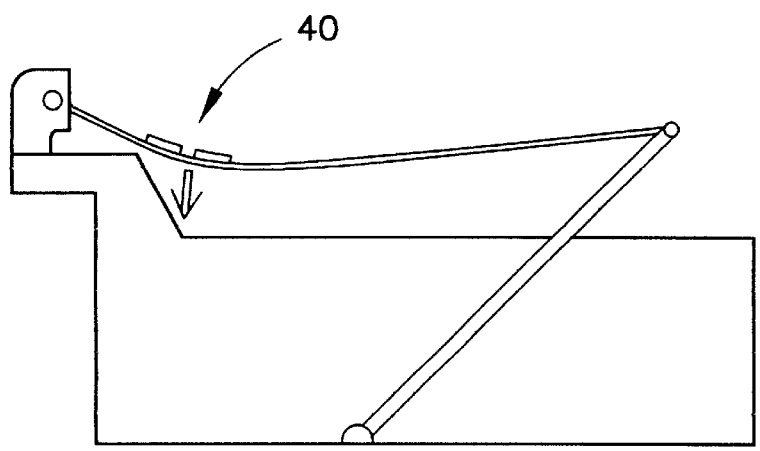
Figure 5C:
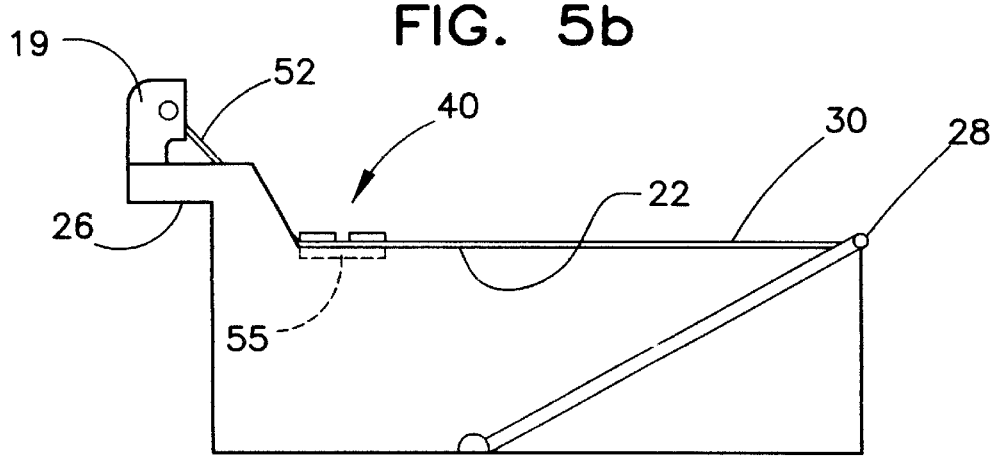

Referring now to sequential to FIGS. 5a–5c, the operation of the flexible tarp 30 is depicted. As shown in FIG. 5a, the extension mechanism 17 pivots in the direction of the arrow to extend the tarp 30 and draw it from the retraction mechanism 19. When the extension mechanism 17 nears the end of its stroke, as depicted in FIG. 5b, the weighted element 40 is drawn from the retraction mechanism 19. The force of gravity tries to pull the weighted element 40 downward, but is resisted by the tension in the tarp 30 while the extension mechanism 17 is still operating. Finally, once the extension mechanism reaches its full stroke, and the tarp 30 is at its extended position 28, the weighted element 40 is nearly at its preferred final position. Preferably, an additional length of the tarp 30 is payed out from the retraction mechanism 19 so that an appropriate lag portion 52 is achieved. In this configuration, the weighted element 40 pulls the tarp 30 down over the load within the container body.

During normal use when the tarp 30 is covering the open top of a container body, the weighted element 40 relies upon gravity to keep the tarp in the position shown in FIG. 5c. As an alternative, an additional retention apparatus can be added to help hold the weighted element 40 in its operative position. For instance, in one embodiment, a magnetic element 55 can be mounted on the container body to help hold the weighted element 40 in position. Of course, the weighted element or the weighted bars must then be formed of a magnetic material. In other instances, a physical catch may be provided into which the weighted element 40 can fall. Similarly, the weighted element can be manual pushed into the catch. This additional retention apparatus may be desirable where the container body and the tarp are expected to be subject to excessive vibration or wind force, such as hauling for long distances over rough terrain.

Figure 6:
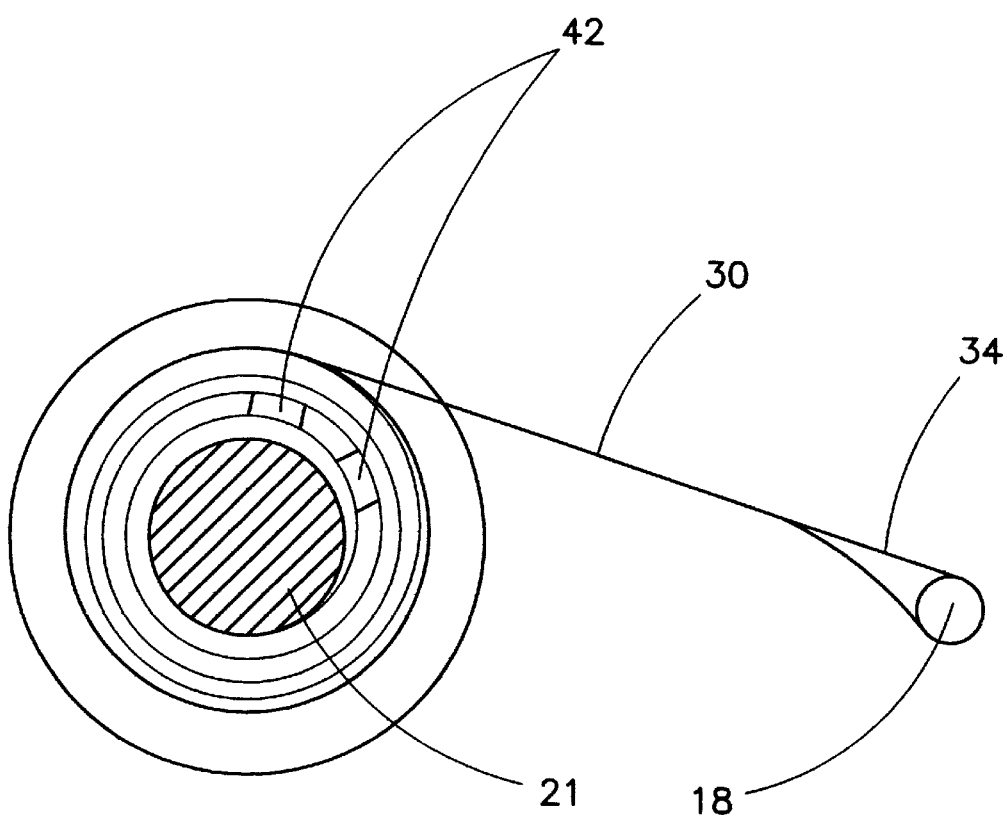
FIG. 6 is a side cross-sectional view of the retraction mechanism of a retraction mechanism with the flexible cover system shown in FIG. 3 rolled thereon.

When it is desired to retract the tarp, the extension and retraction mechanisms can be operated in their normal manner. The weighted element 40 is rolled up with the rest of the tarp material as depicted in FIG. 6. Again, as explained above, it is important that the weighted element 40 has a profile that is sufficiently small to allow the element to be rolled within a tarp without tearing the tarp or causing it to bind within the roller apparatus. It is of course understood that the weighted element 40 will be rolled close to the first end of the tarp, so that it will be rolled over a smaller diameter than the remainder of the tarp, and so that the majority of the tarp material will be wound over the element in the fully retracted configuration.

From the foregoing description, it should be appreciated that the present invention provides a simple and economical system for holding a flexible cover down over a loaded open-topped container. The weighted element 40 and flexible tarp 30 can be configured to allow removal and replacement of the weighted element, or use of the tarp 30 without the weighted elements. The weighted element 40 and pockets 45 allow the present invention to be retrofitted to an existing tarping system. For example, an existing tarp can be modified to add the necessary pockets 45 and weighted bars 42.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For example, the preferred embodiment of the invention is directed to a weighted element situated to hold down, or gravity-bias, a front portion of a flexible cover. The same principles can be applied at different or multiple locations along the length of the cover to help hold the cover down against a load within the container. Thus, as depicted in FIG. 3, additional weighted elements 40, can be disposed on the cover. In this instance, each weighted element can be lighter than the single weighted element 40 described above in connection with the preferred embodiment. The tarpaulin 30 can be configured with multiple pockets along the length of the tarp, which can be kept empty as desired by the operator. Preferably, with this alternative the multiple pockets are spaced along the length of the tarp so that they do not coincide radially with any other pocket when the tarp is wound onto the spool or roller of the retraction mechanism 19.

What is claimed is:

1. A cover system for an open-topped container, comprising:
    a flexible cover having a first end and an opposite second end;
    a retraction mechanism connected to said flexible cover at said first end for moving said cover to a retracted position relative to the container;
    an extension mechanism connected to said flexible cover at said second end for extending said cover from said retracted position to an extended position spanning at least a portion of the open top of the container; and
    a weighted element carried by said flexible cover between said first and second ends and having a weight sufficient to pull said flexible cover down by the force of gravity when said cover is in said extended position.
2. The cover system according to claim 1, wherein:
    said retraction mechanism includes a spool and means for winding said flexible cover onto said spool; and
    said weighted element is sized and configured to be wound onto said spool with said flexible cover.
3. The cover system according to claim 1, wherein:
    said flexible cover has a length between said first and second ends and a width transverse to said length; and
    said weighted element includes a weighted bar extending across a portion of said width of said cover.
4. The cover system according to claim 3, wherein:
    said retraction mechanism includes a spool and means for winding said flexible cover onto said spool; and
    said weighted bar has a width and a thickness sized to permit said weighted bar to be wound onto said spool with said flexible cover.
5. The cover system according to claim 3, wherein said flexible cover includes a pocket extending across a portion of said width and sized to receive said weighted bar therein.
6. The cover system according to claim 5, wherein:
    said weighted element includes a plurality of weighted bars; and
    said flexible cover includes a plurality of pockets extending across a portion of said width and sized to receive a corresponding one of said plurality of weighted bars therein.
7. The cover system according to claim 5, wherein said pocket is closed around its perimeter.
8. The cover system according to claim 5, wherein said pocket includes an open end for insertion of said weighted element.
9. The cover system according to claim 8, wherein said pocket includes a flap configured to close said open end, wherein said flap is displaceable to insert said weighted element into said pocket.
10. The cover system according to claim 1, wherein said weighted element is disposed adjacent to said first end of said flexible cover.
11. The cover system according to claim 10, wherein said weighted element is offset from said first end a predetermined dimension so that said weighted element pulls said flexible cover below a top edge of the container when said cover is in said extended position.
12. The cover system according to claim 1, wherein said weighted element has a weight of at least ten pounds (about 4.5 kg.).
13. The cover system according to claim 1, further comprising a retention device mounted on the container and configured to retain said weighted element when said flexible cover is in its extended position.
14. The cover system according to claim 13, wherein:
    said retention device includes a magnet; and
    said weighted element is formed of a magnetic material.
15. The cover system according to claim 1, further comprising a plurality of weighted elements at spaced locations along a length of said flexible cover between said first and second ends.
16. The cover system according to claim 15, wherein said flexible cover includes a plurality of pockets at said spaced locations sized to carry a corresponding one of said plurality of weighted elements.
17. A cover for a cover system for an open-topped container, the system having a retraction mechanism mounted to the container and a extension mechanism, the cover comprising:
    a flexible tarpaulin sized to substantially close the open top of the container when extended, said tarpaulin having a first end configured for engagement to the retraction mechanism and an opposite second end configured for engagement to the retraction mechanism; and
    a weighted element carried by said tarpaulin between said first and second ends and having a weight sufficient to pull said flexible tarpaulin down by the force of gravity when said tarpaulin is extended.
18. The cover according to claim 17, wherein:
    said tarpaulin has a length between said first and second ends and a width transverse to said length; and
    said weighted element includes a weighted bar extending across a portion of said width.
19. The cover according to claim 18, wherein said weighted bar has a width and a thickness sized to permit said weighted bar to be wound onto a spool of a retraction mechanism with said tarpaulin.
20. The cover according to claim 18, wherein said tarpaulin includes a pocket extending across a portion of said width and sized to receive said weighted bar therein.
21. The cover according to claim 20, wherein said pocket is closed around its perimeter.
22. The cover according to claim 20, wherein said pocket includes an open end for insertion of said weighted element.
23. The cover according to claim 22, wherein said pocket includes a flap configured to close said open end, wherein said flap is displaceable to insert said weighted element into said pocket.
24. The cover according to claim 20, wherein:
    said weighted element includes a plurality of weighted bars; and
    said tarpaulin includes a plurality of pockets extending across a portion of said width and sized to receive a corresponding one of said plurality of weighted bars therein.

25. The cover according to claim 17, wherein said weighted element is adjacent to but offset from said first end.

26. The cover according to claim 17, wherein said weighted element has a weight of at least ten pounds (about 4.5 kg.).

27. A cover for a cover system for an open-topped container, the system having a retraction mechanism mounted to the container and a extension mechanism, the cover comprising:

a flexible tarpaulin sized to substantially close the open top of the container when extended, said tarpaulin having a first end configured for engagement to the retraction mechanism and an opposite second end configured for engagement to the extension mechanism, said tarpaulin having a length between said opposite ends and a width transverse to said length; and a pocket extending across a portion of said width of said tarpaulin adjacent but offset from said first end thereof, said pocket sized to receive a weighted bar therein.

28. The cover according to claim 27, further comprising a plurality of pockets at said first end thereof.

29. The cover according to claim 27, further comprising a plurality of pockets at a plurality of spaced locations along said length of said tarpaulin.

* * * * *